United States Patent
Wu (10) Patent No.: US 9,733,375 B2
(45) Date of Patent: Aug. 15, 2017

(54) METHOD AND DEVICE FOR ALTERNATING DEPTHS MARINE SEISMIC ACQUISITION

(75) Inventor: Zhaohong Wu, Katy, TX (US)

(73) Assignee: CGGVERITAS SERVICES (U.S.) INC., Houston, TX (US)

( * ) Notice: Subject to any disclaimer, the term of this patent is extended or adjusted under 35 U.S.C. 154(b) by 1707 days.

(21) Appl. No.: 13/037,794

(22) Filed: Mar. 1, 2011

(65) Prior Publication Data

US 2012/0224453 A1    Sep. 6, 2012

(51) Int. Cl.
*G01V 1/38* (2006.01)

(52) U.S. Cl.
CPC ...... *G01V 1/3808* (2013.01); *G01V 2210/165* (2013.01)

(58) Field of Classification Search
CPC .............................. G01V 1/38; G01V 1/3808
USPC .......................................... 367/16, 15, 17, 18
See application file for complete search history.

(56) References Cited

U.S. PATENT DOCUMENTS

| | | | |
|---|---|---|---|
| 4,781,140 A * | 11/1988 | Bell et al. ...................... | 114/244 |
| 5,042,611 A | 8/1991 | Howlett | |
| 5,771,202 A * | 6/1998 | Bale et al. ...................... | 367/20 |
| 6,493,636 B1 * | 12/2002 | DeKok ............................. | 702/17 |
| 7,239,577 B2 | 7/2007 | Tenghamn et al. | |
| 7,257,049 B1 * | 8/2007 | Laws et al. ...................... | 367/23 |
| 7,372,769 B2 | 5/2008 | Grion | |
| 2004/0125697 A1 * | 7/2004 | Fleming .......................... | 367/19 |
| 2007/0189117 A1 * | 8/2007 | Robertsson et al. ............. | 367/24 |
| 2008/0019214 A1 * | 1/2008 | Pramik ............................ | 367/16 |
| 2008/0022913 A1 * | 1/2008 | Toennessen et al. ........ | 114/245 |
| 2008/0172181 A1 * | 7/2008 | Barnes ............................ | 702/16 |
| 2008/0285381 A1 * | 11/2008 | Moldoveanu et al. ......... | 367/20 |
| 2009/0016158 A1 * | 1/2009 | Gratacos ........................ | 367/21 |
| 2010/0008184 A1 * | 1/2010 | Hegna et al. .................. | 367/21 |
| 2010/0074049 A1 * | 3/2010 | Kragh et al. .................. | 367/16 |
| 2011/0158044 A1 * | 6/2011 | Moldoveanu et al. ......... | 367/20 |

FOREIGN PATENT DOCUMENTS

| | | |
|---|---|---|
| GB | 2 424 952 A | 10/2006 |
| GB | 2 449 564 A | 11/2008 |
| WO | 01/16621 A1 | 3/2001 |

OTHER PUBLICATIONS

GB Search Report in corresponding Great Britain Application No. GB1203479.9 dated Jan. 4, 2013.
Buia et al. "Shooting Seismic Surveys in Circles", Oilfield Review, Autumn 2008, 1-31, Schlumberger, USA.
GB Search Report in corresponding Great Britain Application No. GB1203479.9 dated Jun. 21, 2012.
Supplemental GB Search Report in corresponding Great Britain Application No. GB1203479.9 dated Jun. 22, 2012.
Australian Patent Examination Report No. 1 issued Jun. 18, 2013, in related Australian Patent Application No. 2012201130.

* cited by examiner

*Primary Examiner* — Hovhannes Baghdasaryan
(74) *Attorney, Agent, or Firm* — Patent Portfolio Builders PLLC (57) ABSTRACT

System and method for enriching a bandwidth of seismic data related to a subsurface of a body of water. The system includes streamers and sources that are towed at alternating depths during consecutive and/or adjacent line of sails or during the same line of sail.

31 Claims, 12 Drawing Sheets

METHOD AND DEVICE FOR ALTERNATING DEPTHS MARINE SEISMIC ACQUISITION

BACKGROUND

Technical Field

Embodiments of the subject matter disclosed herein generally relate to methods and systems and, more particularly, to mechanisms and techniques for seismic data acquisition using a receiver underwater.

Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. While this profile does not provide an accurate location for oil and gas reservoirs, it suggests, to those trained in the field, the presence or absence of the oil and/or gas reservoirs. Thus, providing a high resolution image of the subsurface is an ongoing process for the exploration of natural resources, including, among others, oil and/or gas.

Figure 1:
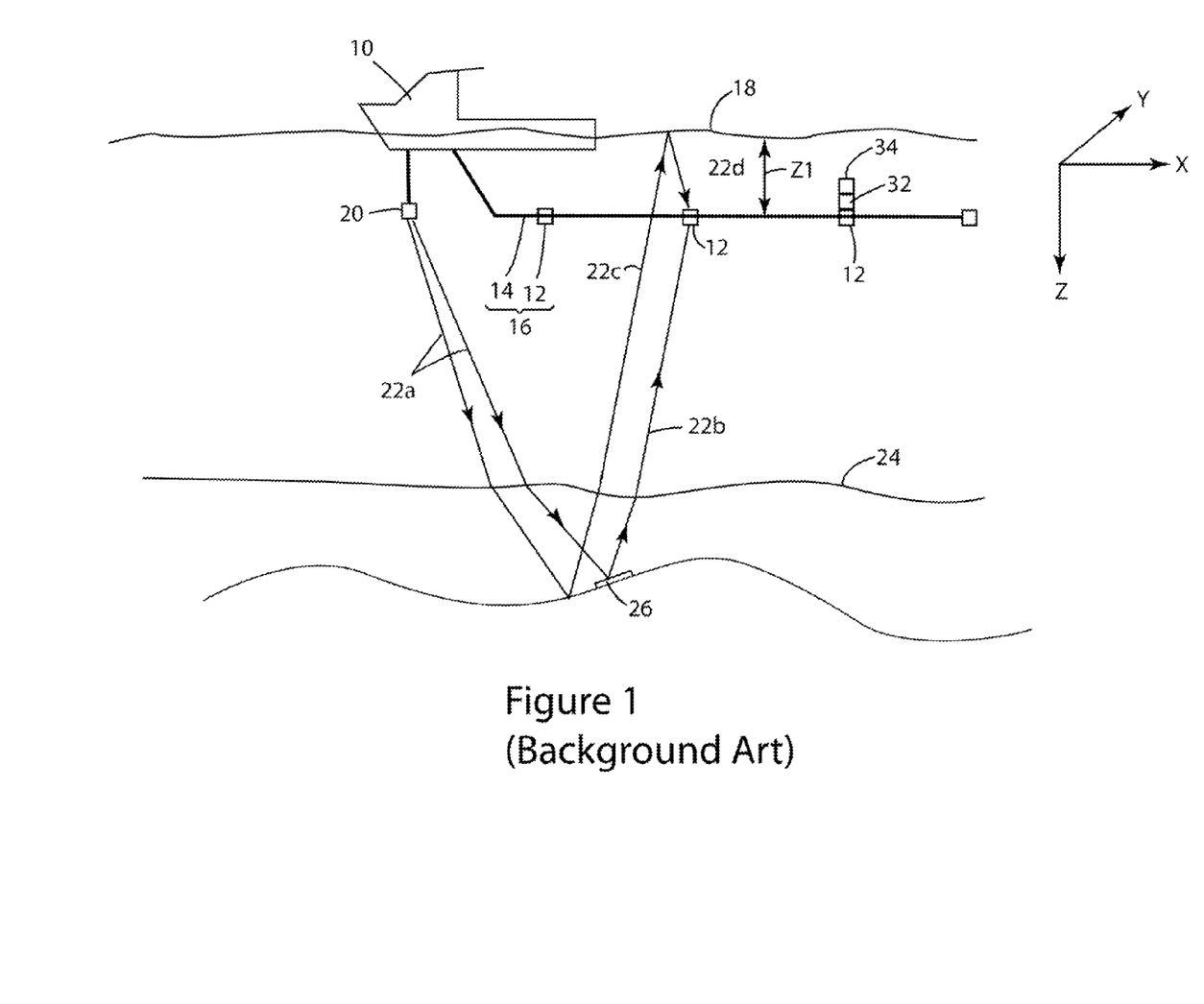
FIG. 1 is a schematic diagram of a conventional seismic data acquisition system having a horizontal streamer.
Figure 2:
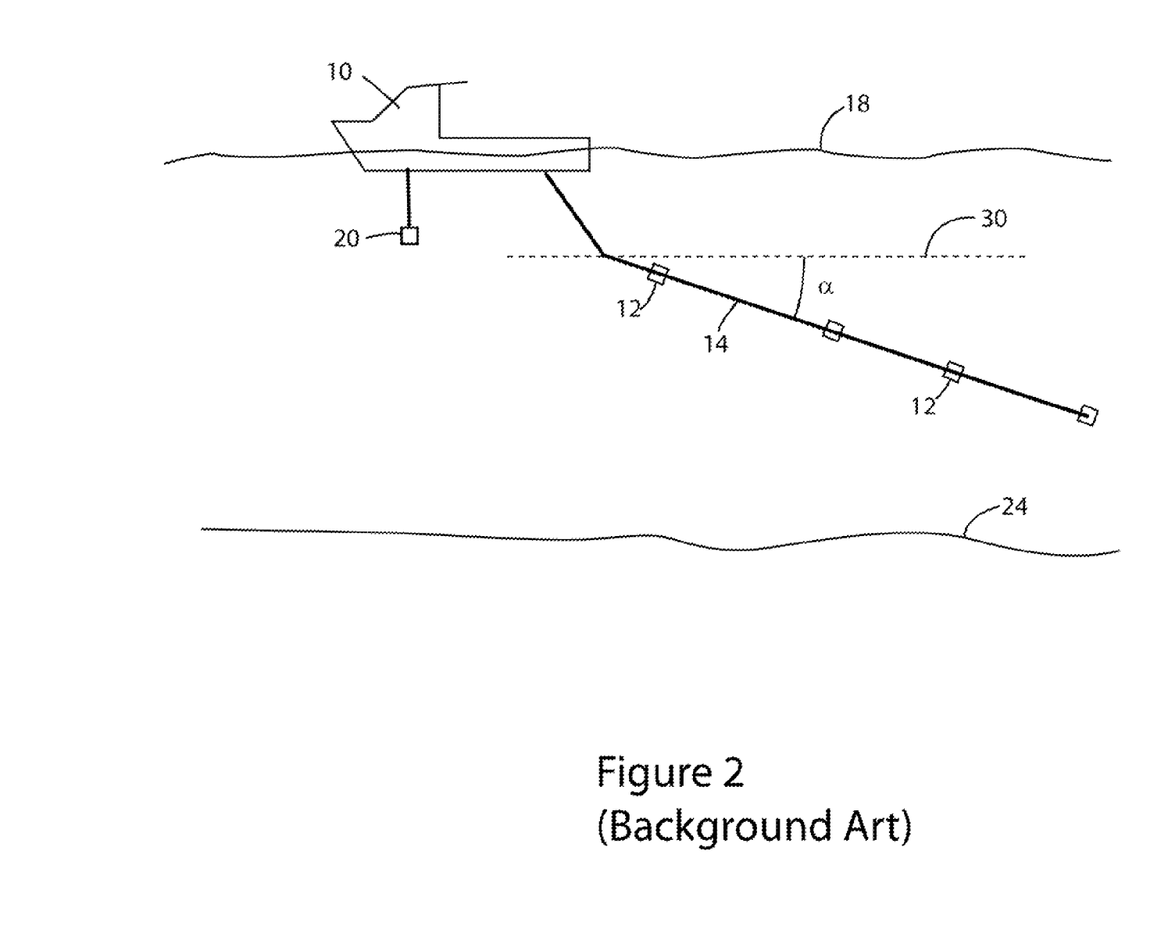
FIG. 2 is a schematic diagram of a slanted seismic data acquisition system.

During a seismic gathering process, as shown in FIG. 1, a vessel 10 drags an array of acoustic detectors 12. Plural acoustic detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to a surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are provided along a slanted straight line 14 making a constant angle α with a reference horizontal line 30. Alternatively, the streamers may have other shapes.

With reference to FIG. 1, the vessel 10 also drags a sound source 20 configured to generate an acoustic wave 22a. The acoustic wave 22a propagates downward and penetrates the seafloor 24, eventually being reflected by a reflecting structure 26 (reflector). The reflected acoustic wave 22b propagates upwardly and is detected by detector 12. For simplicity, FIG. 1 shows only two paths 22a corresponding to the generated acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c travels back towards the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b.

Thus, every arrival of a marine seismic wave at detector 12, with the exception of the direct arrival, is accompanied by a ghost reflection. In other words, ghost arrivals trail their primary arrival and are generated when an upward traveling wave is recorded a first time on submerged equipment before being reflected at the surface-air contact. The now downward propagating reflected wave 22d is recorded a second time at detector 12 and constitutes the ghost. Primary and ghost signals are also commonly referred to as up-going and down-going wave fields.

The time delay between an event and its ghost depends entirely upon the depth of the receiver 12. It can be only a few milliseconds for streamers towed underwater (depths of less than 15 meters) or up to hundreds of milliseconds for deep Ocean Bottom Cable (OBC) and Ocean Bottom Node (OBN) acquisitions. The degenerative effect that the ghost arrival has on seismic bandwidth and resolution are known. In essence, interference between primary and ghost arrivals causes notches or gaps in the frequency content and these notches cannot be removed without the combined use of advanced acquisition and processing techniques.

An improvement to the conventional data acquisition is the use of a wide azimuth acquisition (WAZ). In a typical WAZ survey, two streamer vessels and multiple sources are used to cover a large sea area, and all sources and streamers are controlled at a uniform depth throughout the survey. The WAZ provides a better illumination of the substructure and thus a better final image. However, the presence of the ghosts in the acquired data still affects the final image due to the presence of notches as schematically illustrated next.

Figure 3:
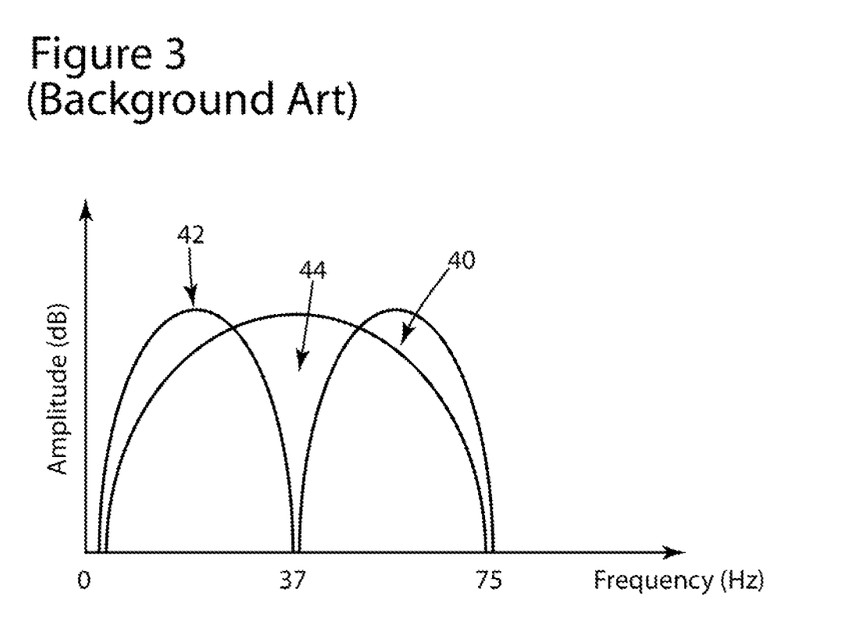
FIG. 3 is a plot of recorded signals versus frequency for primary and ghost components.

A notch centers at a frequency at which a distance between a detecting hydrophone (receiver) of the streamer and the water surface is equal to one-half of its wavelength. FIG. 3 illustrates the spectral difference from streamers towed at 10 m depth (see curve 40) and 20 m depth (see curve 42). FIG. 3 plots an amplitude of the recorded signal versus a corresponding frequency. A notch 44 is also illustrated in FIG. 3. Shallower-towed streamers increase the high-frequency content, but also attenuate the low frequencies because of stronger environmental noise. Deeper-towed streamers, enhance low frequencies, but also move the first spectral notch lower into the frequency band of interest.

Removing the ghost effect has been the subject of geophysical research for many years. Two methods have been developed that enhance the signal to noise ratio and frequency bandwidth compared to standard shallow towed spreads. One such method is the over-under acquisition and it is described in U.S. Pat. No. 7,372,769 (the entire content of which is incorporated by reference herein). In this method, the streamers are either towed as vertically aligned pairs, or towed with regular number of streamers on an upper layer and with a smaller number of streamers at a deeper layer. The shallow towed layer of streamers is used for better mid and upper frequencies in the survey, and the deeper towed layer of streamers is used for better low frequencies. In processing, these two data sets are combined for a better overall spectrum. However, this approach requires additional number of streamers and imposes another level of operation complexity that lead to lower acquisition efficiency.

The second method uses a dual sensor approach (U.S. Pat. No. 7,239,577, the entire content of which is incorporated herein by reference). This method uses velocity sensors (e.g., gimbaled geophones) that are co-located with pressure gradient sensors (hydrophones) in the streamer. Hence, the two sets of data are collected from the same location and used to compensate each other for subsequent data combination to remove the spectral notches. However, this approach needs special streamers each with twice as many sensors as the regular streamers.

Accordingly, it would be desirable to provide systems and methods that avoid the afore-described problems and drawbacks, and improve the accuracy of the final image.

SUMMARY

According to an exemplary embodiment, there is a method of enriching an acquisition bandwidth of seismic data related to a subsurface of a body of water. The method includes towing underwater along a first line of sail (i) at a first depth, at least one seismic source configured to generate a seismic wave and (ii) at a second depth, at least one streamer having at least one receiver configured to record reflections in the subsurface of the seismic wave; firing the at least one seismic source while being towed along the first line of sail; recording the reflections of the seismic wave along the first line of sail; changing the first line of sail to a second line of sail; towing underwater along the second line of sail the at least one seismic source and the at least one streamer, wherein the at least one seismic source is towed at a third depth different from the first depth or the at least one streamer is towed at a fourth depth different from the second depth; and recording new reflections along the second line of sail.

According to another exemplary embodiment, there is a method of enriching an acquisition bandwidth of seismic data related to a subsurface of a body of water. The method includes towing underwater along a first line of sail a first system including (i) at a first depth, at least two seismic sources configured to generate seismic waves and (ii) at a second depth, at least two streamers having receivers configured to record reflections in the subsurface of the seismic waves; firing at least one of the two seismic sources while being towed along the first line of sail; recording the reflections of the seismic waves along the first line of sail; changing the first line of sail to a second line of sail; towing underwater along the second line of sail the at least two seismic sources and the at least two streamers, wherein the at least two seismic sources are towed at a third depth different from the first depth or the at least two streamers are towed at a fourth depth different from the second depth; and recording new reflections along the second line of sail.

According to still another exemplary embodiment, there is a seismic data collection system for enriching a bandwidth of seismic data related to a subsurface of a body of water. The system includes a first set of sources configured to be towed by a first vessel; a first set of streamers configured to be towed by the first vessel and/or a second vessel; a second set of sources configured to be towed by a third vessel; a second set of streamers configured to be towed by the third and/or a fourth vessel; and a control mechanism configured to adjust a first depth of the first set of sources, a second depth of the second set of sources, a third depth of the first set of streamers and a fourth depth of the second set of streamers so that at least one depth of the first to fourth depths alternates as a line of sail of a fleet that includes first to four vessels is changed in a predetermined block.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of wide azimuth acquisition with alternating streamers and/or source depths. However, the embodiments to be discussed next are not limited to these configurations, but may be extended to other arrangements as discussed later.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a method for enriching the WAZ data uses alternating streamers and/or sources depths between sail lines for obtaining data sets with mutually supplementing frequency contents that can be processed to remove ghost effects caused, for example, by water surface reflection. According to another exemplary embodiment, a method for enriching the WAZ data uses alternating depths for the streamers and/or sources along a same sail line, for example, if the weather becomes adverse, the streamers and/or the sources may be lowered to not be affected by the waves.

Figure 4:
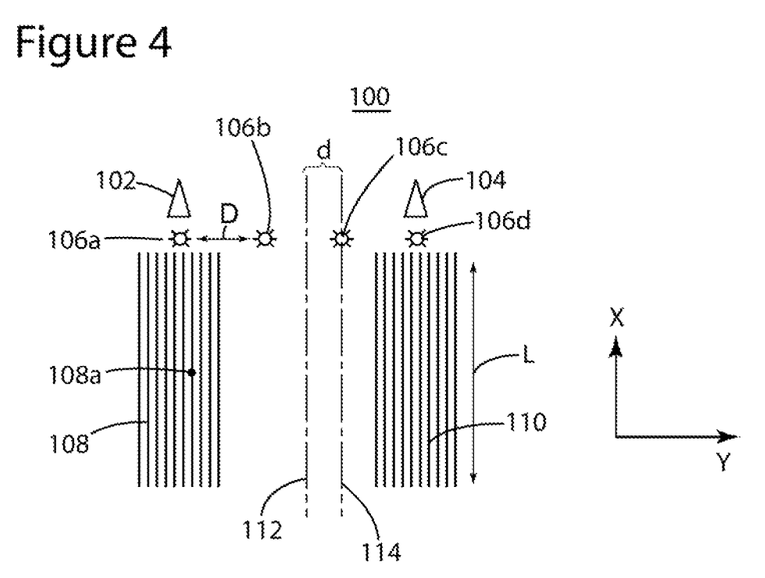
FIG. 4 is a schematic diagram of a WAZ system according to an exemplary embodiment.

According to an exemplary embodiment illustrated in FIG. 4, a WAZ arrangement 100 may include first streamer vessel 102, a second streamer vessel 104 and multiple seismic sources 106a-d. It is noted that FIG. 4 shows one of many possible arrangements and the novel features to be discussed in this document also apply to an arrangement having only one vessel, or only one seismic source or only one streamer or a combination therein. For example, the novel features to be discussed next may be applied to a single vessel having a plurality of streamers and only one source. Also, it is noted that the source may be an acoustic source (e.g., air gun), an electromechanic vibrating source, or other known sources. In addition, the novel features to be discussed next also apply to NAZ (Narrow AZimuth) survey, and other derivations that include circular shooting survey, MAZ (Multiple AZimuth), FAZ (Full AZimuth) survey, etc. The arrangement shown in FIG. 4 is discussed for simplicity and this arrangement is not intended to limit the applicability of the exemplary embodiments.

Figure 5A:
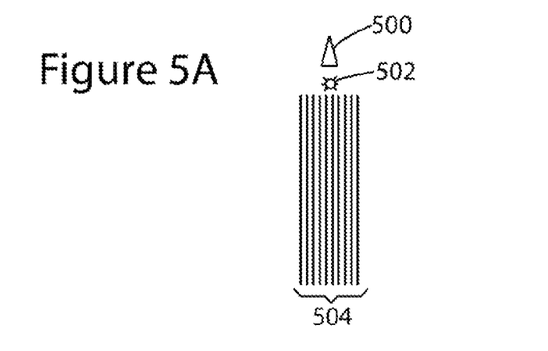
FIGS. 5A-F show various sail line geometries for seismic data acquisition.
Figure 5B:
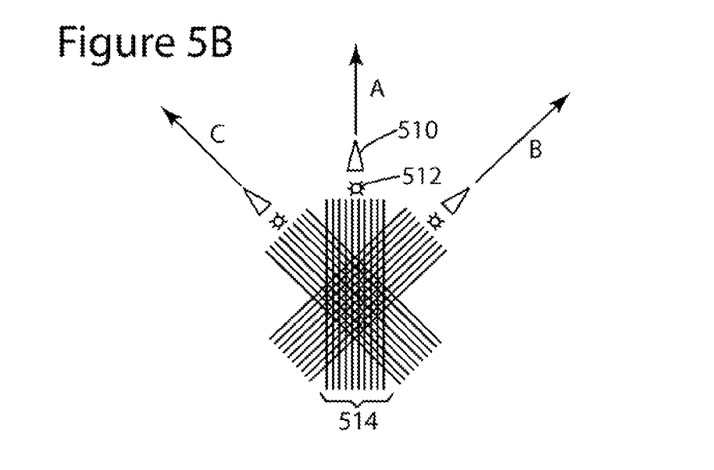
Figure 5C:
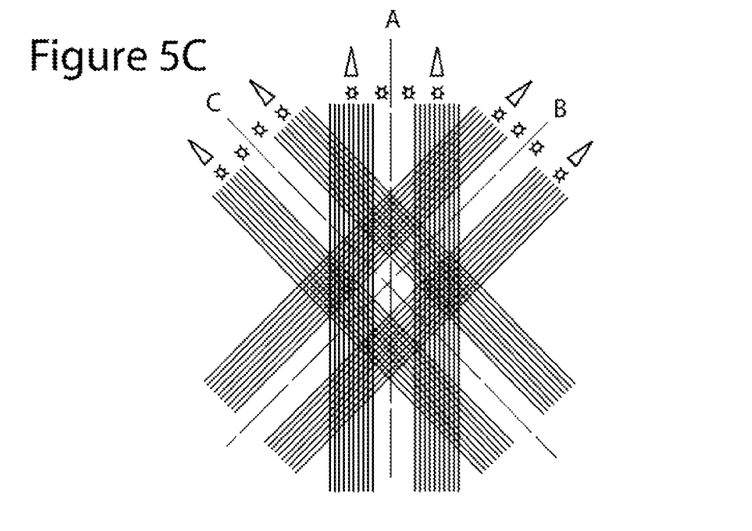
Figure 5D:
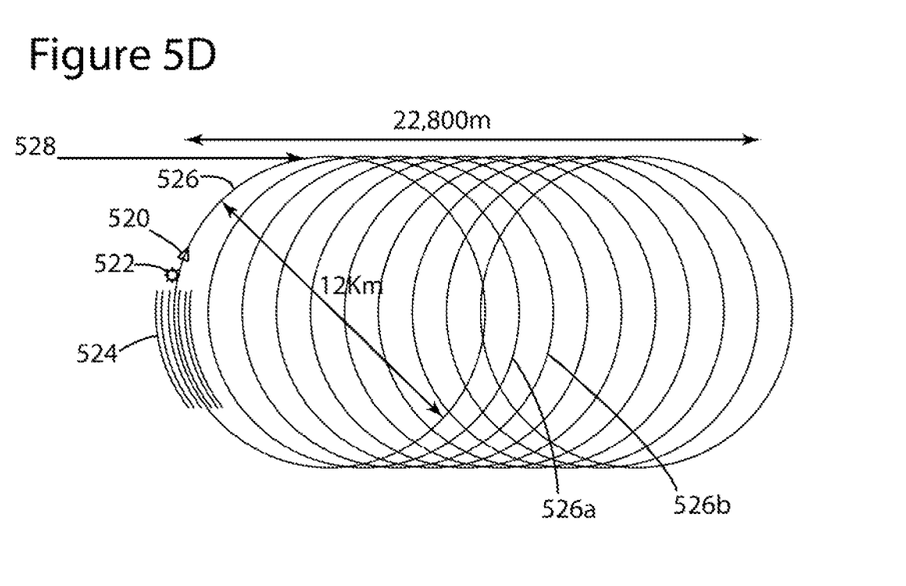
Figure 5E:
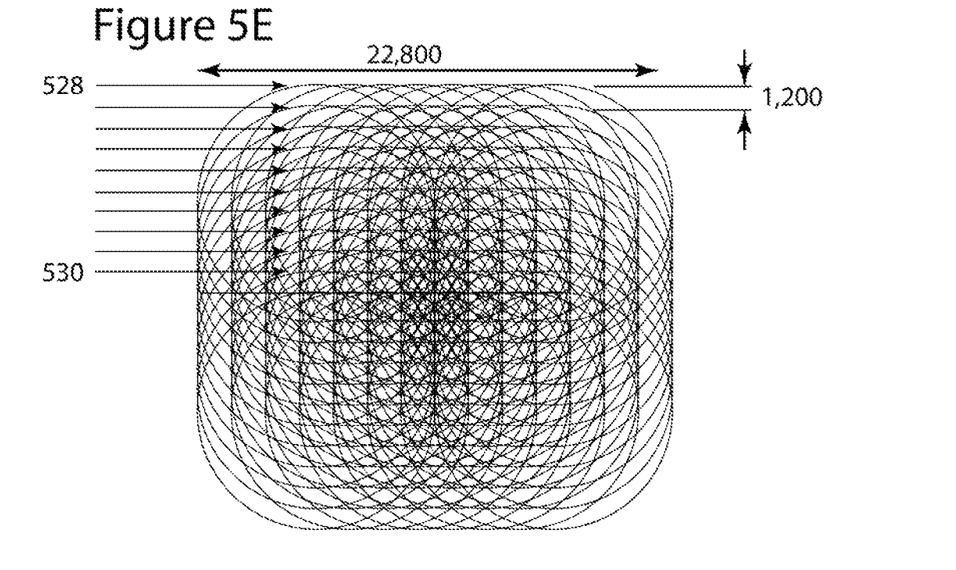

Other arrangements to which the novel features to be discussed next may be applied are illustrated in FIGS. 5A-E. FIG. 5A shows the NAZ arrangement in which a vessel 500 tows a source 502 and a spread 504 of streamers. FIG. 5B shows the MAZ arrangement in which a vessel 510 having a source 512 and a spread 514 follows sail lines A, B and C that intersect each other. FIG. 5C shows the RAZ arraignment, which is similar to the arraignment shown in FIG. 4 with the difference that the sail lines A, B, and C intersect each other. FIG. 5D shows a circular (coil) shooting arrangement in which a vessel 520 tows a source 522 and a spread of streamers 524 along a circle sail 526. After this, the vessel follows a second circle sail 526a, a third one 526b, and so on until the vessel completes a coil 528. A diameter of the circle may be around 12 km and a length of the coil may be around 23 km. Other numbers may be used depending on the substructure, and the equipment used. As shown in FIG. 5E, the vessel may complete plural coils 528 to 530 with a certain offset (e.g., about 1 km) between consecutive coils. These are only a few of the arrangements to which the novel features to be discussed next may be applied. It would be recognized by those skilled in the art that other arrangements may be imagined and those shown in FIGS. 5A-E are for illustrative purposes.

Returning to FIG. 4, each vessel 102 and 104 is configured to tow a set of streamers 108 and 110, respectively. Because the streamer vessels 102 and 104 cover a large sea area, the WAZ surveys have good coherent noise attenuation from the power of azimuth stack. In order to acquire a large range of azimuths for each common mid-point (CMP), a distance "d" between two adjacent sail lines 112 and 114 in a pre-plot is equal to a distance "D" between two adjacent sources multiplied by a predetermined factor x. This predetermined factor x may be, for example, about 0.5. Thus, for a distance D of about 1200 m between the sources 106a and 106b, a distance d between adjacent sail lines is around 600 m. For this example, a length L of the streamers may be around 8100 m, and if each vessel tows 12 streamers with 100 m streamer separation, the fleet width is about 4800 m, which is 8 times of the distance of two adjacent sail lines. With such a setting, the streamers of the WAZ fleet acquire data for each CMP up to 7 times but each time with different cross line offset and azimuth.

Figure 5F:
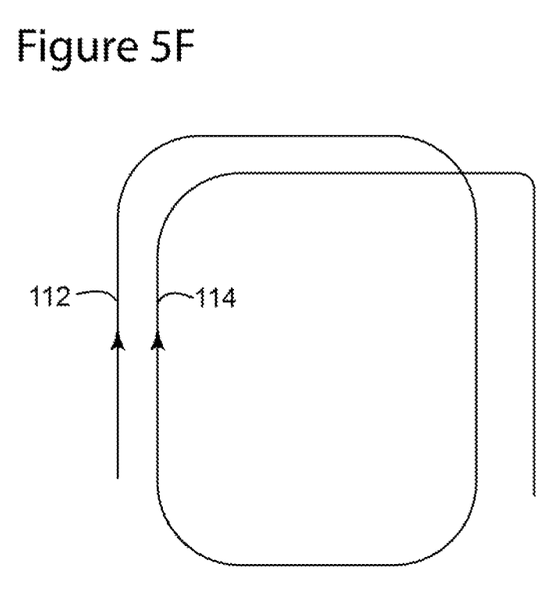

A few remarks about the conventions used in seismic acquisition data are believed to be in order now. FIG. 4 shows an X axis extending along the streamers and a Y axis extending perpendicular to the streamers. The XY plane is substantially parallel with a surface of the water. A Z axis, not shown, indicates a depth of the water. The X axis is referred to as the inline and the Y axis is referred to as the crossline. A CMP is a point at water surface at a half distance (e.g., along X axis) between a source 106a and a receiver 108a recording a wave produced by the source 106a and reflected from the subsurface. A pre-plot is a dedicated term of art for identifying the route and method to survey a geological area. The line of sail 112 is extending along the X axis, which is also the traveling direction of the vessels 102 and 104 and a position of the line of sail 112 along the Y axis is at a middle distance between the first set of streamers 108 and the second set of streamers 110. Of course, other definitions for the line of sail may be used. The two lines of sail 112 and 114 appear to be substantially parallel to each other. However, as discussed above with regard to FIGS. 5A-E this is not the case for all the seismic data acquisition. Even if the lines of sail are parallel and adjacent to each other as shown in FIG. 4, they are not necessarily followed in this order as shown in FIG. 5F.

In the conventional methods, all streamers are set at a uniform depth throughout the survey irrespective of the line of sail, and all sources are also set at another uniform depth throughout the survey irrespective of the line of sail. The depth of the sources may be the same or different from the depth of the streamers. The method of this exemplary embodiment alternates streamer and/or source depths between sail lines 112 and 114 (for example, during a line change) to obtain data sets of supplementing frequency contents without degrading data richness in azimuth and offset. Note that sail lines 112 and 114 do not have to be two consecutive lines. In practice there may be other sail lines shot in between for easy turn of the whole fleet.

Still with regard to FIG. 4, it is noted that a first source 106a attached to vessel 102 is positioned centrally (along Y axis) to the set of streamers 108. Similarly, source 106d is positioned centrally to the set of streamers 110. However, source 106b is positioned outside a projection of the set of streamers 108 on the Y axis, similar to source 106c being positioned outside of a projection of the set of streamers 110 on the Y axis. Further, it is noted that both sources 106b and 106c are provided between the sets of streamers 108 and 110 while surveying. In one application, for the two spatially adjacent sail lines 112 and 114, there is a shift "d" in positions of the sets of streamers 108 and 110 and the sources 106 along the Y axis, the distance "d" being smaller than "D", the distance between two adjacent sources.

Figure 6:
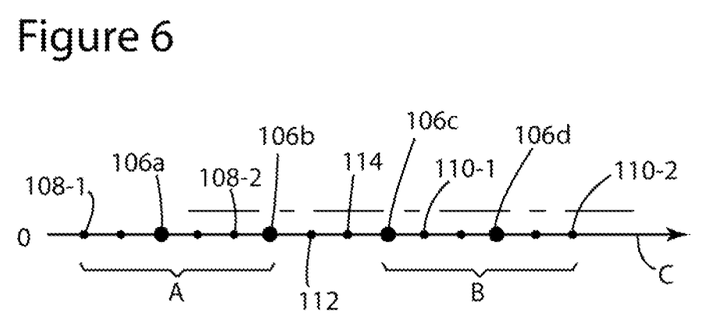
FIGS. 6-9 are plots illustrating various configurations of streamers and seismic sources towed underwater according to exemplary embodiments.

The arrangement shown in FIG. 4 may be also illustrated with the help of the Y axis as shown in FIG. 6. Considering that the first set of streamers 108 and the seismic sources 106a and 106b form a first system A and the second set of streamers 110 and seismic sources 106c and 106d form a second system B, the projections of the seismic sources and the outer streamers 108-1, 108-2, 110-1, and 110-2 of the first and second sets of streamers on a reference line C are illustrated in FIG. 6. FIG. 6 also illustrates a position of the first and second lines of sail 112 and 114. It is noted that the projection of the second line of sail 114 on the Y axis does not have to coincide with the projection of the seismic source 106c as shown in FIG. 4. It is noted that in one application, the distance between two adjacent sail lines is less than the distance between source 106B and 106C.

Figure 7:
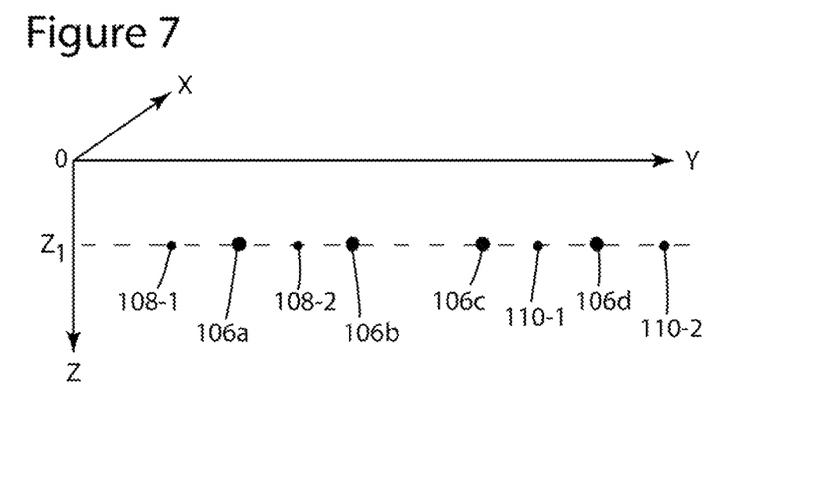
Figure 8:
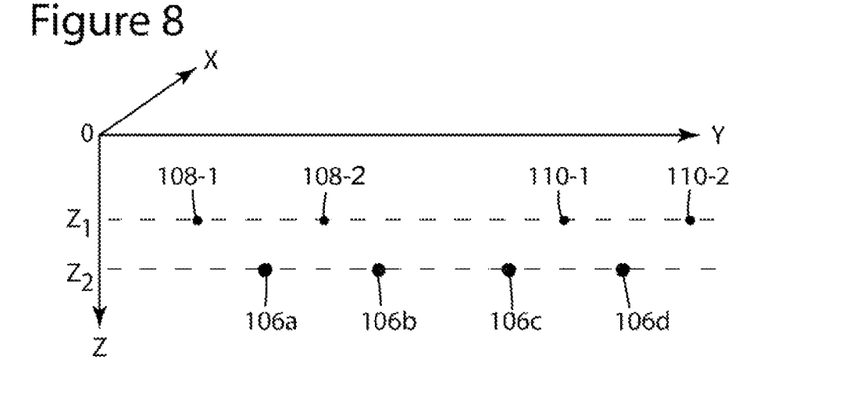
Figure 9:
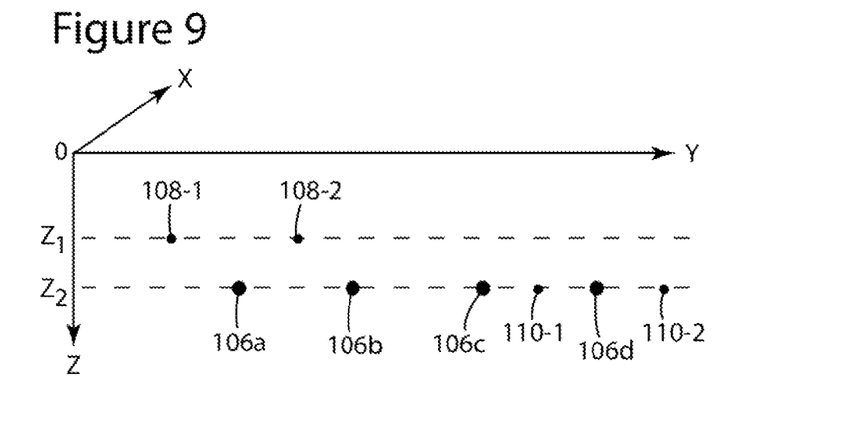

According to an exemplary embodiment, the sets of streamers 108 and 110 and the sources 106a-c are towed at a same depth z1 along the first line of sail 112 as shown in FIG. 7. However, in another exemplary embodiment illustrated in FIG. 8, the set of streamers may be towed at a first depth z1 and the sources may be towed at a second depth z2 along a line of sail. According to still another exemplary embodiment illustrated in FIG. 9, the first set of streamers may be towed at the first depth z1 and the second set of streamers may be towed at a different depth z2 during a same survey. According to still another exemplary embodiment, the sets of streamers may be towed at plural depths, one depth for each line of sail. According to yet another exemplary embodiment, a first vessel tows its streamers at a first depth and a second vessel tows its streamers at a second depth while cruising along a same line of sail. The above arrangements may be provided for the sources. Other depth permutations for the sources or streamers and sources may be used. For simplicity, the next exemplary embodiment considers that the sets of streamers 108 and 110 and the sources 106a-d are towed at a same first depth z1 along the first line of sail 112 and are towed at a second depth z2 along the second line of sail 114.

Figure 10:
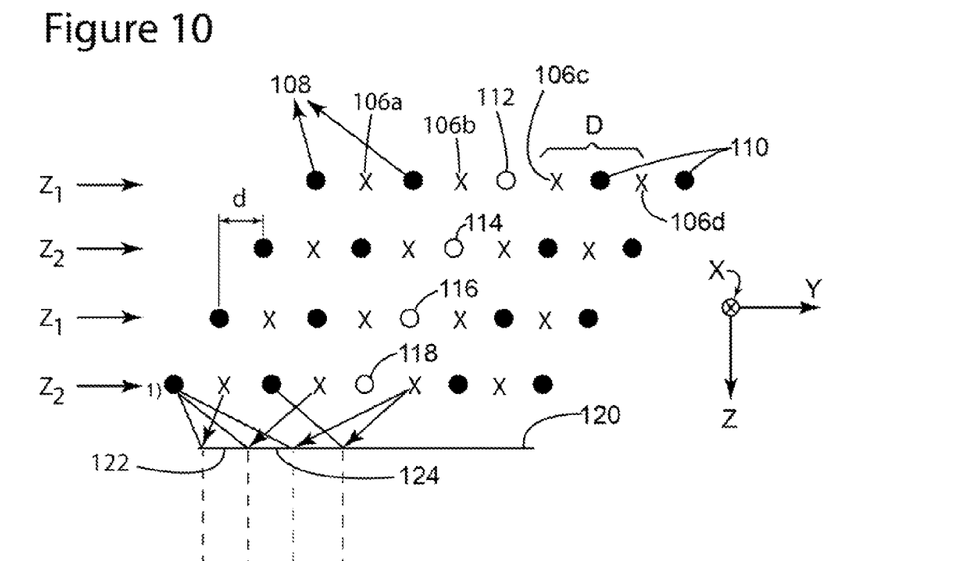
FIG. 10 is a schematic diagram of plural streamers and sources towed at alternating depths according to an exemplary embodiment.

According to an exemplary embodiment illustrated in FIG. 10, the two streamer vessels with corresponding sets of streamers (represented by solid circles) and sources (represented by cross-marks) are schematically shown surveying the subsurface of the ocean along four different lines of sails 112 to 118. Although this description refers to the ocean, it is noted that one skilled in the art would understand that the embodiments apply to any body of water and its subsurface, e.g., lake, sea, etc. Each line of sail and the corresponding streamers and sources are represented at a given depth, z1 or z2. The streamers extend along axis X, which enters into the page in FIG. 10. The orientation of the axes Y and Z is also shown. For example, the sets of streamers 108 and 112 and sources 106a-d are first towed along axis X along line of sail 118 at the second depth z2. Then, the sets of streamers and sources are towed along a direction of axis X along the line of sail 116 at the first depth z1, and along the line of sail 118 at the second depth z2 and along the line of sail 112 at the first depth z1 each at some stage of the survey. Thus, an offset of the lines of sail are calculated in such a way that a point in the subsurface is surveyed multiple times for adjacent lines of sail. In one application, for a distance D of substantially 1200 m and a distance d of substantially 600 m, the first depth z1 is about 20 m and the second depth z2 is about 10 m. Other numbers and profiles of the streamers may be used depending on the application.

Thus, according to this exemplary embodiment, two adjacent lines of sail do not have the same depths for the streamers and/or sources. Further, as discussed above, this novel method may be extended to have only the streamers or only the sources being towed at different alternating depths. As also discussed above, the novel method may be applied to a single vessel having a single source and at least one streamer.

A cross line 120 in the survey is shown as being composed of alternating sections 122 and 124, each section representing a predetermined CMP strip where the CMP strip is a vertical projection of the scanned sub-surface into the water surface.

Figure 11:
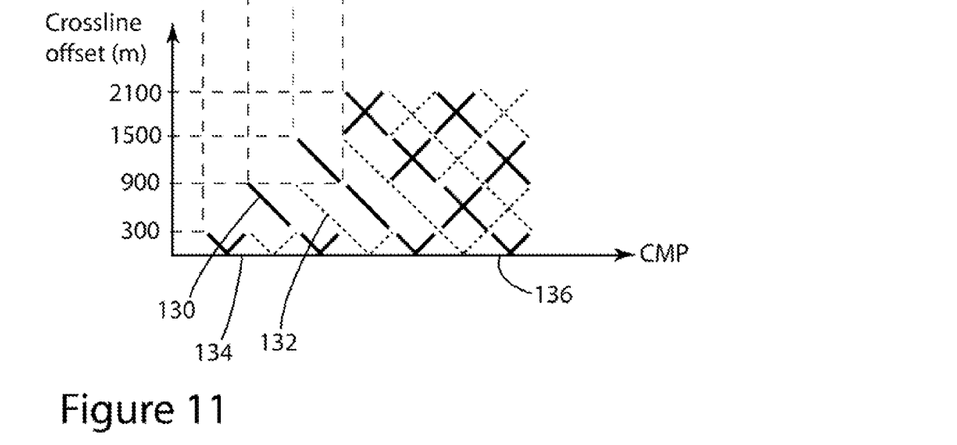
FIG. 11 is a graph illustrating signals recorded for various subsurface points by using streamers and sources towed at alternating depths according to an exemplary embodiment.

In the coverage chart of FIG. 11, the samples (crossline offset at y axis, CMP at x axis) are represented either by a solid line 130 (corresponding to depth z2) or a dash line 132 (corresponding to depth z1). The left most CMP strip 134 gets sampled only once, but rightward and inward going, the CMP strips are more frequently sampled that peak at seven times (see strip 136) followed by an alternating full sampling pattern. This pattern shows a CMP gather of various azimuths and offsets, and also demonstrates how the data from shallow tow and deep tow are distributed in a cross line offset respectively.

Figure 12:
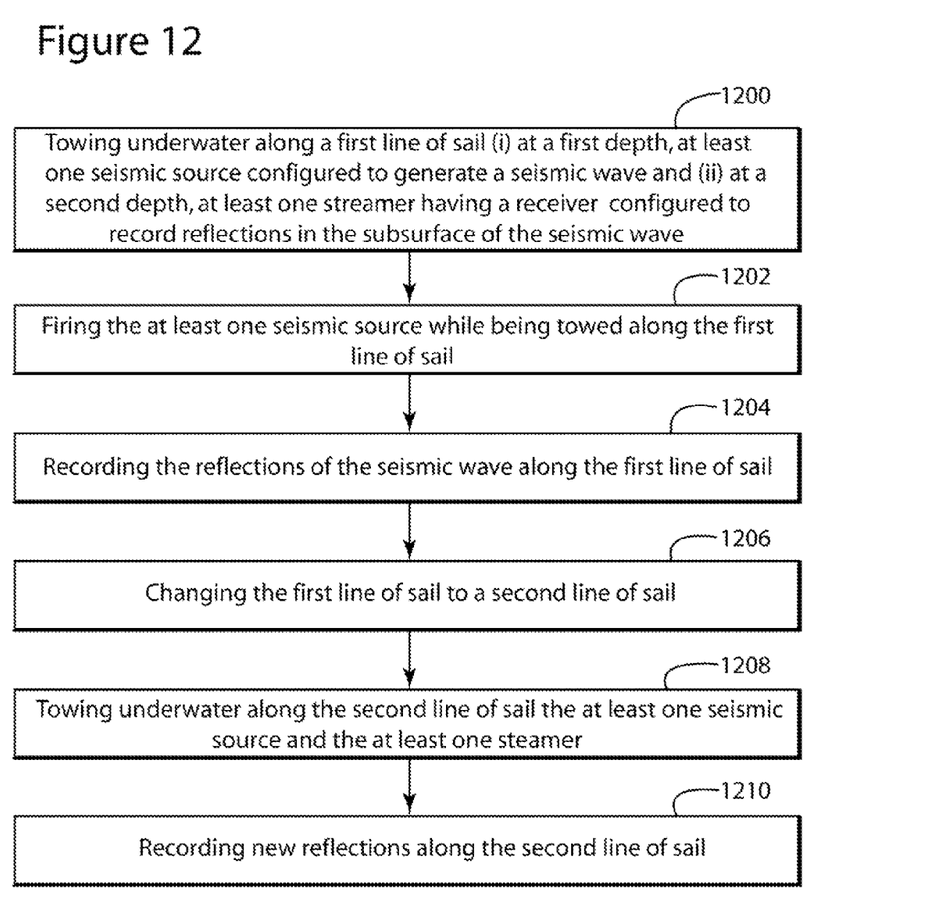
FIG. 12 is a flowchart illustrating a method for enriching WAZ data by using a seismic source and a streamer towed at alternating depths according to an exemplary embodiment.

According to an exemplary embodiment illustrated in FIG. 12, there is a method for enriching a bandwidth of seismic data and/or extending an operation weather window related to a subsurface of a body of water. The method includes a step 1200 of towing underwater along a first line of sail (i) at a first depth, at least one seismic source configured to generate a seismic wave and (ii) at a second depth, at least one streamer having a receiver configured to record reflections in the subsurface of the seismic wave; a step 1202 of firing the at least one seismic source while being towed along the first line of sail; a step 1204 of recording the reflections of the seismic wave along the first line of sail; a step 1206 of changing the first line of sail to a second line of sail; and a step 1208 of towing underwater along the second line of sail the at least one seismic source and the at least one streamer. It is noted that when the weather is not appropriate (e.g., large waves, high wind, etc.), the partial or complete spread can be set at deep depths to continue the data collection operation with lower noise and easier positioning. The method further includes a step 1210 of recording new reflections along the second line of sail. The at least one seismic source is towed at a third depth different from the first depth or the at least one streamer is towed at a fourth depth different from the second depth during the second line of sail.

Figure 13:
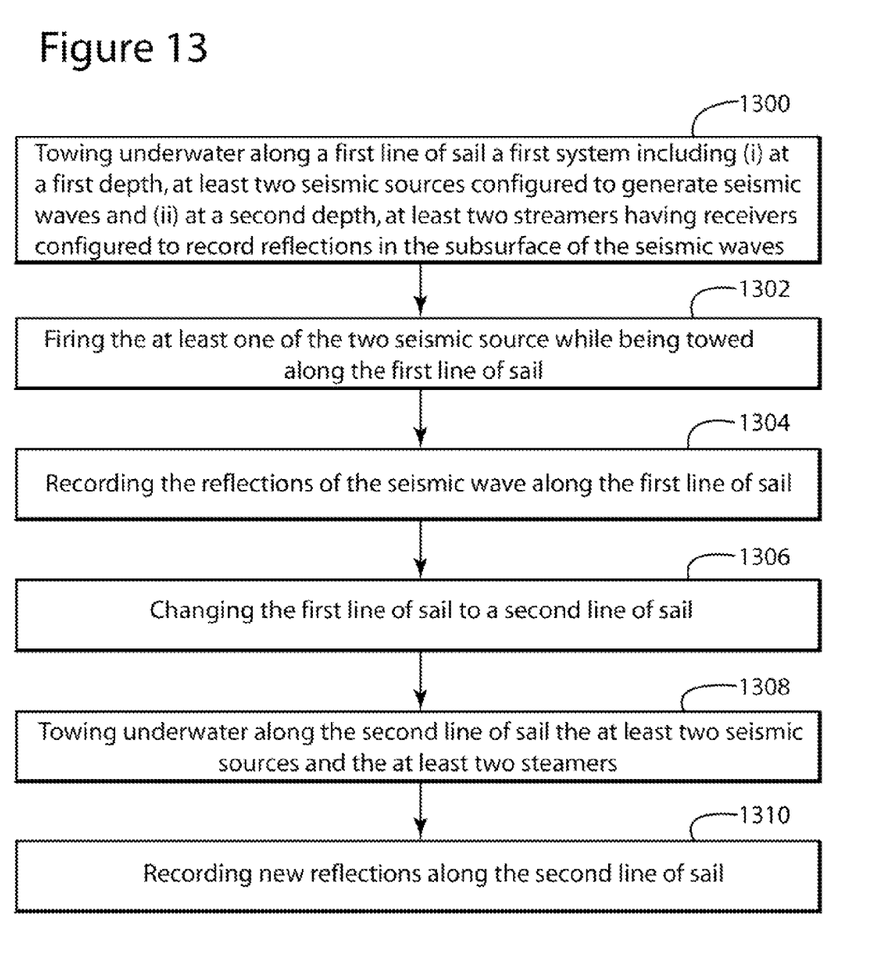
FIG. 13 is a flowchart illustrating a method for enriching WAZ data by using plural seismic sources and plural streamers towed at alternating depths according to an exemplary embodiment.

According to another exemplary embodiment illustrated in FIG. 13, there is a method for enriching a bandwidth of seismic data and/or extending an operation weather window related to a subsurface of a body of water. The method includes a step 1300 of towing underwater along a first line of sail a first system including (i) at a first depth, at least two seismic sources configured to generate seismic waves and (ii) at a second depth, at least two streamers having receivers configured to record reflections in the subsurface of the seismic waves; a step 1302 of firing the at least one seismic sources while being towed along the first line of sail; a step 1304 of recording the reflections of the seismic waves along the first line of sail; a step 1306 of changing the first line of sail to a second line of sail that is substantially parallel to the first line of sail; and a step 1308 of towing underwater along the second line of sail the at least two seismic sources and the at least two streamers. It is noted that when the weather is not appropriate, the partial or complete spread can be set at deep depths to continue the data collecting operation with lower noise and easier positioning. The method further includes a step of 1310 of recording new reflections along the second line of sail.

A projection of one of the at least two seismic sources on an axis Y substantially perpendicular to the first line of sail is between projections of the at least two streamers on the Y axis and a projection of the other one of the at least two seismic sources on the Y axis is outside the projections of the at least two streamers. In one application, a distance between the two adjacent lines of sail is proportional with a distance between the at least two seismic sources of the first system. In another application, the at least two seismic sources are towed at a third depth different from the first depth or the at least two streamers are towed at a fourth depth different from the second depth.

Unlike the two-layer acquisition approach described in the background section, the novel method discussed above does not require redundant streamers and challenging over-under operations. However, the novel method obtains comparable if not better information without degrading data richness in azimuth and offset compared to a conventional WAZ survey.

Further, it is noted that the discussed WAZ method does not require additional work compared to a traditional WAZ operation except one additional task: changing the streamer and/or source depth typically during a line of sail change. This task may be performed, for example, with an automated system that has remote controlled winches integrated into streamer head floats, tail buoys and the depth adjustment devices distributed along a streamer, and have remote controlled winch integrated into source subarray or use submersible source float to allow automatic depth adjustment of sources, and a software control platform to reliably coordinate such an overall depth change in a line of sail change dynamic environment.

According to another exemplary embodiment, the depths of the streamers and/or sources may be changed as the surveying vessel progresses along a given line of sail. In other words, there is no need to wait for a line of sail change for changing the depths of the streamers and/or sources as discussed above. The operator of the surveying vessel may determine, e.g., due to the bad weather conditions, to lower the streamers and/or sources while in the middle of the line of sail so that the waves produced by the unfavorable weather does not affect the measurements and no time is wasted by the surveying vessel. Thus, it is possible to change the depth of the streamers and not the depth of the sources, or to change the depth of the sources and not the depth of the streamers, or to change both the depths of the streamers and the sources along the same line of sail.

The advantages of one or more of the exemplary embodiments discussed above include a broader signal bandwidth with lower frequency content from deeper tow for deeper acoustic penetration and better subsalt stratigraphic and structural imaging, and higher frequency content from shallower tow for better image resolution, with same azimuth and offset coverage as conventional uniform depth WAZ survey; higher signal-to-noise ratio through line shopping, i.e., picking a line of sail (shallow or deeper tow) according to weather conditions, and an extended weather window for less vessel down time by line shopping. Similar benefits can be drawn from applying this alternating depth acquisition method towards MAZ, RAZ and circular shooting surveys that can have various survey geometries and fleet configurations. A common feature among the different types of surveys is that a CMP can get sampled multiple times, by alternating the depths of streamer and/or source. Thus, the CMP samples are acquired with different source/receiver depths that enrich the collected data with one more dimension, which can be used later during the data processing stage for broader bandwidth.

Figure 14:
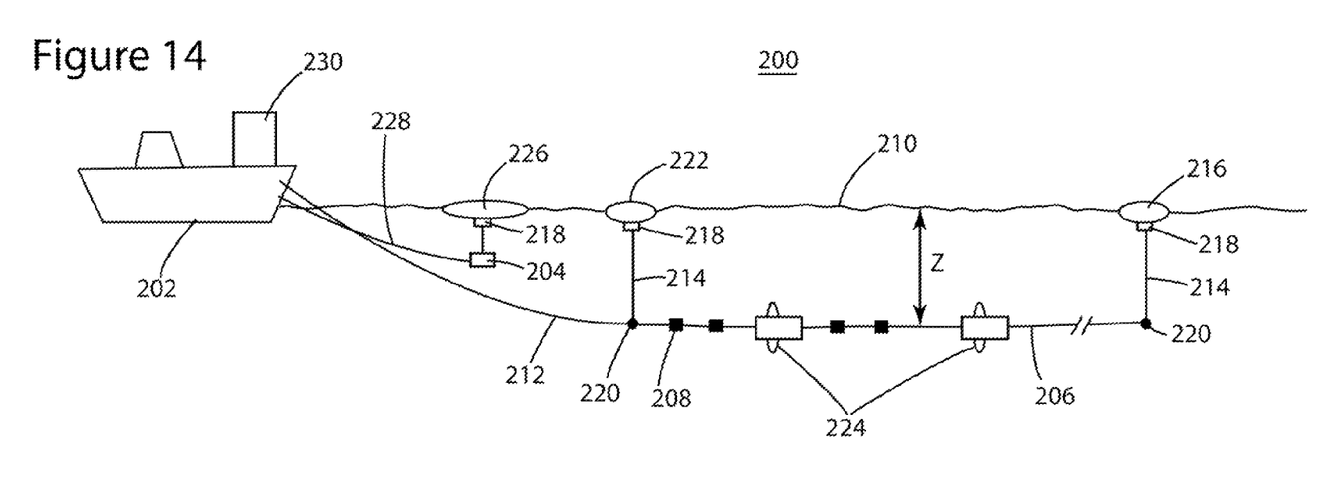
FIG. 14 is a schematic diagram of a system for alternating depths of streamers and/or sources according to an exemplary embodiment.

Such an automatic system 200 is schematically illustrated in FIG. 14 in which a vessel 202 is shown towing one or more sources 204 and a streamer 206. The source 204 may be an electro-mechanic vibrating source or an acoustic source, e.g., a gun array. The streamer 206 includes plural receivers 208 (e.g., hydrophones) distributed at predetermined distances along the streamer. A depth z of the streamer 206 relative to the surface 210 of the ocean is controlled by, for example, Nautilus 224—a device with wings for both depth and lateral control (provided by CGGVeritas, France) that is distributed along the streamer, and/or winches 218 mounted on or under a head float 222 or tail buoy 216 that can adjust the length of the link cable 214 attached to a streamer connection 220. The lead-in cable 212 in front of the streamer is connected to the vessel 202. One or more winches 218 may be provided to control a depth of the source 204. The umbilical cable 228 connects the source system to the vessel. The winches may be automatically controlled by a control mechanism 230 provided on the vessel 202.

Figure 15:
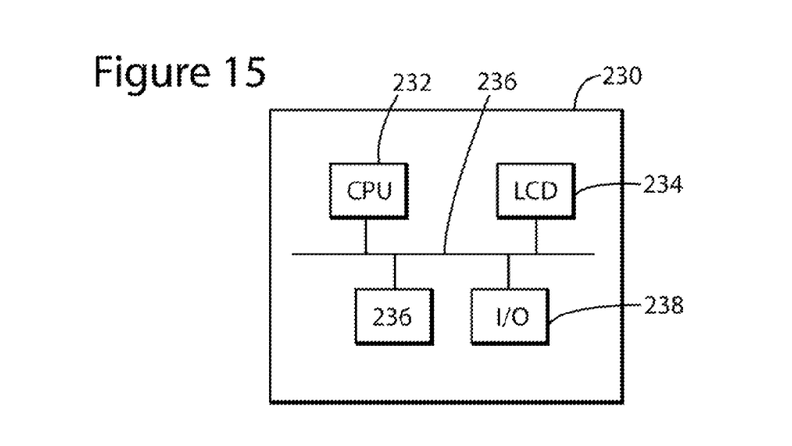
FIG. 15 is a schematic diagram of an apparatus configured to adjust depths of streamers and/or sources according to an exemplary embodiment.

The control mechanism 230 is illustrated in FIG. 15 and may include a processor 232 for performing the processing discussed above, i.e., controlling the depth of the sources and the streamers, and optionally, a monitor 234 for displaying the results of the processing. The processor 232 may communicate with the monitor 234 via a bus 236. The control mechanism 230 may also include a storage device 236 for storing necessary instructions and/or data. Control mechanism 230 may include other components as known by those skilled in the arts, e.g., input/output interface 238, modem, internet connection, satellite link, GPS capabilities, etc. In one application, the apparatus 230 is a server and includes between tens and thousands of processors 232 and storage devices 236. It is noted that apparatus 230 is a specific device as the processing of the input data discussed above requires such a specialized device.

According to an exemplary embodiment, the control mechanism 230 may receive, via the input/output interface 238 information pertinent to a position of the source 204 and/or streamer 206. In addition, the control mechanism 230 may be configured to receive GPS data from a dedicated system so that when a line of sail is modified the control mechanism 230 automatically adjusts the positions of the source and/or streamers according to a predetermined plan. The above discussed methods may be implemented into the control mechanism 230. The control mechanism may be an apparatus, a computer, software or a combination thereof.

The disclosed exemplary embodiments provide a system and a method for seismic data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of enriching an acquisition bandwidth of seismic data related to a subsurface of a body of water, the method comprising:

towing underwater along a first line of sail (i) at a first depth, at least one seismic source configured to generate a seismic wave and (ii) at a second depth, at least one streamer having at least one receiver configured to record reflections in the subsurface of the seismic wave;

firing the at least one seismic source while being towed along the first line of sail;

recording the reflections of the seismic wave along the first line of sail;

changing (A) the first line of sail to a second line of sail, and (B) the first depth to a third depth different from the first depth, or the second depth to a fourth depth different from the second depth;

towing underwater, along the second line of sail, the at least one seismic source and the at least one streamer, the at least one seismic source being towed at the third depth, or the at least one streamer being towed at the fourth depth; and recording new reflections along the second line of sail.

2. The method of claim 1, further comprising:
extending an operation weather window for collection of the seismic data by increasing depth for at least one the at least one source and the at least one streamer when adverse weather is present.

3. The method of claim 1, wherein the first depth is different from the second depth.

4. The method of claim 1, wherein the third depth is substantially equal to the first depth and the fourth depth is different from the second depth.

5. The method of claim 1, wherein the fourth depth is substantially equal to the second depth and the first depth is different from the third depth.

6. The method of claim 1, wherein the first line of sail is substantially parallel to the second line of sail and the first line of sail is adjacent to the second line of sail.

7. The method of claim 1, wherein the first line of sail intersects the second line of sail.

8. The method of claim 1, wherein the first line of sail is a first circle and the second line of sail is a second circle offset from the first circle.

9. A method of enriching an acquisition bandwidth of seismic data related to a subsurface of a body of water, the method comprising:

towing underwater along a first line of sail a first system including (i) at a first depth, at least two seismic sources configured to generate seismic waves and (ii) at a second depth, at least two streamers having receivers configured to record reflections in the subsurface of the seismic waves;

firing at least one of the two seismic sources while being towed along the first line of sail;

recording the reflections of the seismic waves along the first line of sail;

changing (A) the first line of sail to a second line of sail and (B) the first depth to a third depth different from the first depth, or the second depth to a fourth depth different from the second depth;

towing underwater, along the second line of sail, the at least two seismic sources and the at least two streamers, the at least two seismic sources being towed at the third depth or the at least two streamers being towed at the fourth depth; and recording new reflections along the second line of sail.

10. The method of claim 9, further comprising:
extending an operation weather window for collection of the seismic data by increasing depth for at least one of the at least two seismic sources and the at least two streamers when adverse weather is present.

11. The method of claim 9, wherein a projection of one of the at least two seismic sources on an axis Y substantially perpendicular to the first line of sail is between projections of the at least two streamers on the Y axis and a projection of the other one of the at least two seismic sources on the Y axis is outside the projections of the at least two streamers.

12. The method of claim 9, wherein a distance between the two lines of sail is proportional with a distance between the at least two seismic sources of the first system.

13. The method of claim 9, wherein the first depth is different from the third depth and the second depth is substantially equal to the fourth depth.

14. The method of claim 9, wherein the second depth is different from the fourth depth and the first depth is substantially equal to the third depth.

15. The method of claim 9, wherein the first and second depths are substantially equal, the third and the fourth depths are substantially equal, and the first depth is different from the third depth.

16. The method of claim 9, wherein the first line of sail is substantially parallel to the second line of sail and the first line of sail is adjacent to the second line of sail.

17. The method of claim 9, wherein the first line of sail intersects the second line of sail.

18. The method of claim 9, wherein the first line of sail is a first circle and the second line of sail is a second circle offset from the first circle.

19. The method of claim 9, further comprising:
towing underwater the at least two seismic sources and at least two streamers along a third line of sail, and an offset between the second line of sail and the third line of sail is substantially the same with an offset between the first line of sail and the second line of sail.

20. The method of claim 19, wherein the offset between two adjacent lines of sails is substantially half of the distance between the at least two seismic sources.

21. The method of claim 9, further comprising:
towing underwater, along the first line of sail, a second system including another two sources and another two streamers that are configured substantially symmetric to the first system relative to the first line of sail.

22. The method of claim 21, further comprising:
towing underwater both the first and second systems along the second line of sail, the second system having substantially equal depths for the seismic sources and streamers as the first system.

23. The method of claim 21, further comprising:
recording multiple signals per common mid-point (CMP) corresponding to a reflector in a subsurface of the ocean by towing the first and second systems with alternate depths for the streamers or sources along multiple lines of sail covering a given block.

24. The method of claim 23, further comprising:
alternating the depths of the streamers or sources along multiple lines of sail that are being offset by a distance proportional to a distance between two sources of the first or second system.

25. The method of claim 23, further comprising:
alternating the depths of the streamers and the sources along multiple lines of sail that are being offset by a distance proportional to a distance between two sources of the first or second system.

26. The method of claim 21, further comprising:
towing underwater the first and second systems so that projections on the Y axis of a source from the first system and a source from the second system are between projections on the Y axis of the streamers of the first system and the second system.

27. A seismic data collection system for enriching a bandwidth of seismic data related to a subsurface of a body of water, the system comprising:
 a first set of sources configured to be towed by a first vessel;
 a first set of streamers configured to be towed by the first vessel or a second vessel;
 a second set of sources configured to be towed by a third vessel;
 a second set of streamers configured to be towed by the third or a fourth vessel; and
 a control mechanism configured to adjust a first depth of the first set of sources, a second depth of the second set of sources, a third depth of the first set of streamers and a fourth depth of the second set of streamers so that at least one depth of the first to fourth depths changes as a line of sail of a fleet that includes first to four vessels is changed in a predetermined block.

28. The system of claim 27, wherein an operation weather window of the system is extended for collecting the seismic data by increasing depths for the first set of sources, the second set of sources, the first set of streamers or the second set of streamers when adverse weather is present.

29. The system of claim 27, wherein the control mechanism is configured to set the first to fourth depths to a predetermined first depth along first, third and fifth lines of sail and to a predetermined second depth along second, fourth and sixth lines of sail.

30. The system of claim 27, wherein the first and second set of streamers extend along an X axis, a Y axis is substantially perpendicular to the X axis and parallel to the sea surface, and projections on the Y axis of a source from the first set of sources and a source from the second set of sources are between projections on the Y axis of the streamers of the first set of streamers and the second set of streamers.

31. The system of claim 27, wherein a distance between sources of the first set of sources is about 1200 m and an offset between consecutive lines of sail is about half the distance between the sources.

* * * * *